Figures 1, 2, 3:
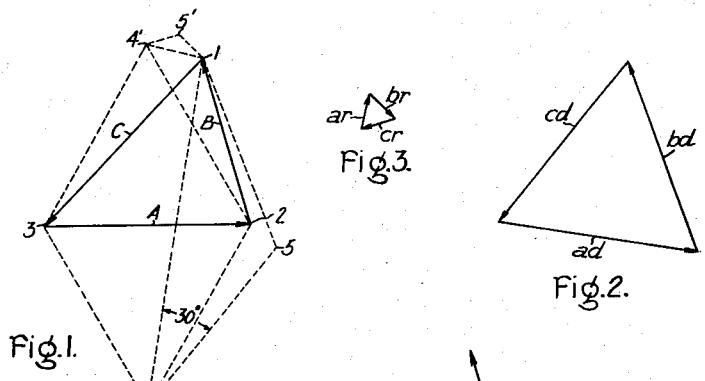

April 21, 1936.  T. A. RICH  2,038,383

SYMMETRICAL COMPONENT MEASURING INSTRUMENT

Filed March 27, 1935  3 Sheets-Sheet 1

Inventor:
Theodore A. Rich,
by Harry E. Dunham
His Attorney.

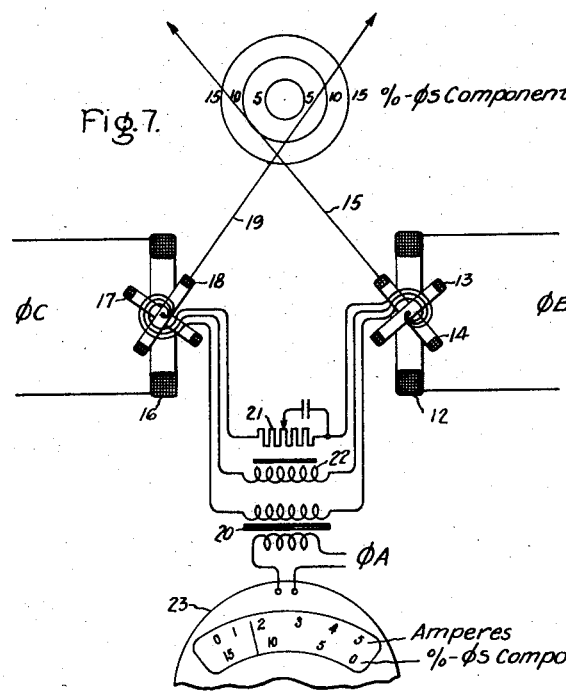
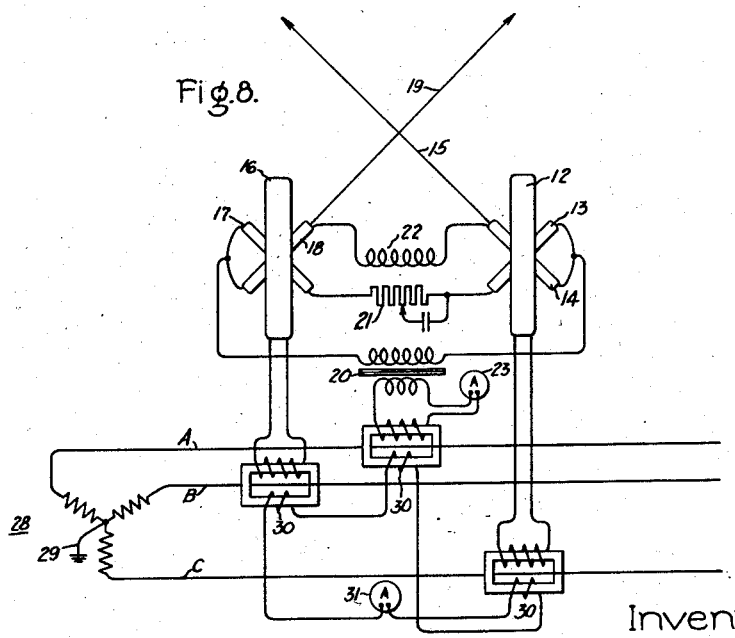

April 21, 1936.  T. A. RICH  2,038,383

SYMMETRICAL COMPONENT MEASURING INSTRUMENT

Filed March 27, 1935  3 Sheets-Sheet 3

Inventor:
Theodore A. Rich,
by Harry E. Dunham
His Attorney.

Patented Apr. 21, 1936

2,038,383

UNITED STATES PATENT OFFICE 2,038,383

SYMMETRICAL COMPONENT MEASURING INSTRUMENT

Theodore A. Rich, Schenectady, N. Y., assignor to General Electric Company, a corporation of New York Application March 27, 1935, Serial No. 13,272

19 Claims. (Cl. 171—95)

My invention relates to instruments for measuring and indicating the sinusoidal vector triangle and symmetrical components and other related factors due to unbalanced conditions in three-phase circuits and its main object is to provide relatively simple and inexpensive measuring apparatus for this purpose.

When a three-phase alternating-current generating system becomes unbalanced, trouble is apt to result if the unbalanced condition is pronounced or prolonged. Not only does an unbalanced condition reduce the efficiency of the system and increase the difficulty of regulation but it is apt to cause overheating and damage to the generating equipment. The difficulty due to unbalanced conditions, of course, increases with the extent of unbalance. It is, therefore, desirable to provide apparatus that may be used to measure and indicate the magnitude and nature of unbalanced conditions, where such conditions are likely to exist in a degree to cause trouble, in order that steps may be taken to correct the difficulty before damage results.

The instrument of my invention may be used to measure voltage unbalance conditions or current unbalance conditions depending upon whether it is energized by the voltages or the currents of the system under investigation.

It is known that any unbalanced three-phase system of sinusoidal vectors may be resolved into three component systems of vectors. If the three-phase power system from which the vectors are taken has no neutral connection or its equivalent, the sum of the sinusoidal vectors is zero and they may then be resolved into two of the above mentioned component systems of vectors, one comprising equal vectors located one hundred and twenty degrees apart, having the same phase order or phase rotation as the original unbalanced sinusoidal vectors, and called the "positive or direct symmetrical phase sequence vector components", and the other comprising equal vectors located one hundred and twenty degrees apart, having a reverse phase order or phase rotation as compared to the original unbalanced sinusoidal vectors, and called the "negative phase or reverse symmetrical phase sequence vector components". For a more detailed statement and explanation of the above, see page 337, Chapter XII of "Principles of Alternating Currents" by Ralph R. Lawrence, first edition, fifth impression.

The instrument of my invention is applicable for measurements on systems of the class in which the three-phase current or voltage vectors thereof may be resolved into the two systems of positive phase sequence and negative phase sequence symmetrical components. It is also applicable to three-phase systems having a neutral connection or its equivalent if steps are taken to eliminate the effect of any neutral current in the system on the measuring instrument.

In carrying my invention into effect in its preferred form, I provide a pair of phase-measuring instruments so related and connected to the system under investigation as to reproduce in effect a vector diagram or triangle representative of the sinusoidal phase vectors under investigation, one side of which triangle constitutes an imaginary line drawn between the pivot points of the two phase-measuring instruments and the other two sides of the triangle are formed by the pointers of the instruments which cross each other. I then provide this instrument with a stationary scale system from which the positive and negative phase sequence component relationship may be read off directly by reference to the crossing point of the two pointers. Various other quantities related to the condition of unbalance may also be indicated as will be explained more in detail hereinafter.

Figure 6:
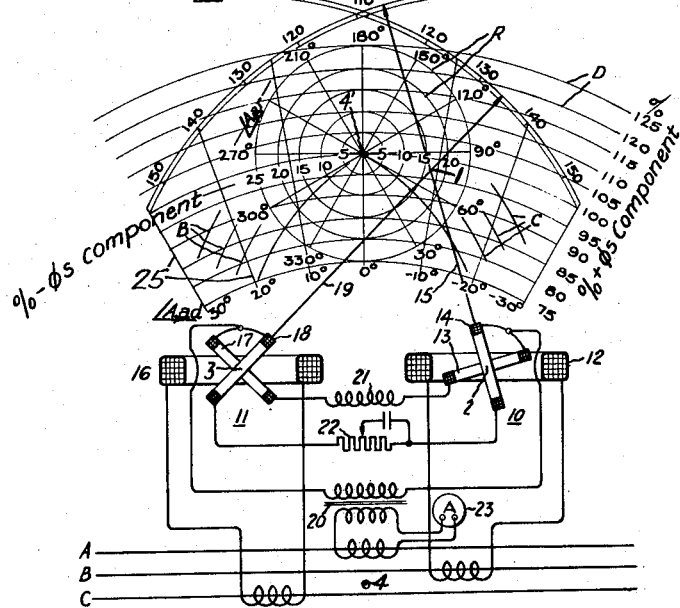
Figure 9:
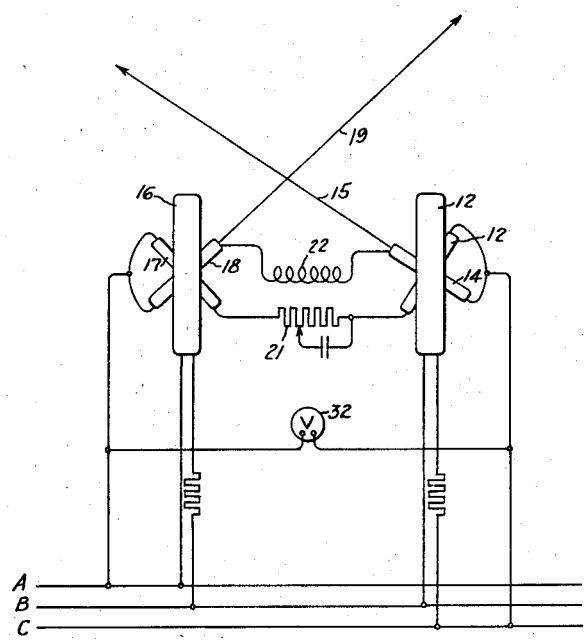
Figure 10:
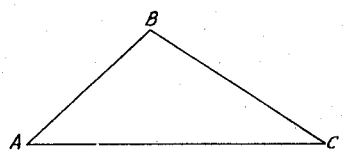

The features of my invention which are believed to be novel and patentable will be pointed out in the claims appended hereto. For a better understanding of my invention, reference is made in the following description to the accompanying drawings. Figs. 1 to 5 inclusive are vector diagrams explanatory of the derivation of the symmetrical direct and reverse phase components of a three-phase system and of the theory of construction and operation of my symmetrical component meter; Fig. 6 shows a symmetrical component ammeter and the line connections thereof to a three-phase system having no neutral; Fig. 7 shows a negative phase sequence ammeter associated with a line ammeter calibrated for permissible negative sequence current; Fig. 8 shows the connections for a symmetrical component ammeter to a three-phase system having a grounded neutral; Fig. 9 shows the line connections for a symmetrical component voltmeter; and Fig. 10 is a vector diagram of the line voltages, which diagram is reproduced by the phase component meter of Fig. 9.

In Fig. 1, the full line triangle having sides indicated by A, B, and C will be taken to represent the sinusoidal vector relationship of the currents or voltages of an unbalanced three-phase system having no neutral or its equivalent so that the triangle closes. For example, the vector diagram of the unbalanced three-phase currents represented in Fig. 5 may be redrawn as in Fig. 1. Then the unbalanced current triangle of Fig. 1 may be resolved into two systems of symmetrical component three-phase currents having reverse phase rotations, which systems are represented by the separate equilateral triangles of Figs. 2 and 3. Thus, Fig. 2 represents the positive or direct phase sequence components and Fig. 3 represents the negative or reverse phase sequence components. The direct phase sequence components have the same phase rotation as the original vectors ABC and the reverse phase sequence components have a reverse phase rotation.

There are different ways of obtaining the direct and reverse phase sequence vectors from any known unbalanced vector diagram, Fig. 1, but one of the simplest ways is explained by Lawrence on pages 345 and 346 of his book, previously mentioned, which is briefly as follows:

In Fig. 1 construct an equilateral triangle 2, 4, 3 using the A vector as a base. Draw the diagonal 1—4 and, using 1—4 as a base, draw the isosceles triangle 1—5—4 with thirty degree angles at 1 and 4 and the line 1—5 is one of the three equal direct phase sequence vectors or, in other words, line 1—4 is the $\sqrt{3}$ times the direct phase sequence vector rotated minus thirty degrees. If I then construct the equilateral triangle 2, 3, 4', draw the line 1—4', and construct the thirty degree base angle isosceles triangle 1—5'—4', I arrive at the reverse phase sequence vector 1—5' or the distance 1—4' is the negative sequence vector times the $\sqrt{3}$ rotated plus thirty degrees. The correctness of this derivation of the direct and reverse phase sequence vectors is more fully explained by Lawrence, is also explained by W. V. Lyon in the Electrical World for June 5, 1928, and may, therefore, be taken as correct without going further into its proof here.

Figures 4, 5:
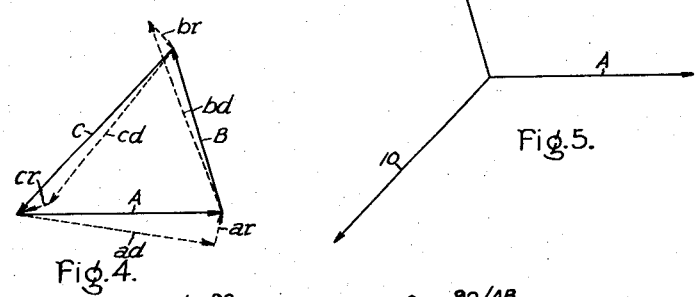

Since all of the direct phase sequence vectors are known to be equal and to be displaced in phase by one hundred twenty degrees and the same is true of the reverse phase sequence vectors, it is unnecessary to determine more than one of each and determine their angular relation to the original unbalanced vectors. Fig. 4 shows all of the direct and reverse phase sequence vectors combined vectorially and superimposed on the original unbalanced triangle, illustrating that the combination is equivalent to the original triangle. In Figs. 2, 3, and 4, $ad$ and $ar$, etc., represent respectively the direct and reverse phase sequence components corresponding to phase A, etc.

My measuring instrument represented in Fig. 6 is based upon the principle of derivation of the direct and reverse symmetrical phase components as exemplified in Fig. 1. This measuring instrument or apparatus includes two phase-measuring instruments 10 and 11. Instrument 10 has its stationary coil 12 energized by the current of phase B of the three-phase system ABC and has its moving coil system comprising cross coils 13 and 14 energized by the current in phase A of the system in such a way that instrument 10 measures the phase angle between the currents in phases A and B, and such that the angle formed between the pointer 15 of said instrument and a line drawn between the pivot points 2, 3 of the two instruments equals the angle 3—2—1 of the main vector triangle of Fig. 1 at any instant.

Instrument 11 has its stationary coil 16 energized by the current in phase C of the three-phase power system while its moving system comprising cross coils 17 and 18 is connected in series with the cross coil system of instrument 10 and is thus energized by current from phase A of the power system. Instrument 11 is arranged to measure the phase angle between the currents in phases A and C such that the angle between its pointer 19 and the line 3—2 between the pivot points of the two instruments is equal to the angle 1—3—2 of the sinusoidal vector triangle of Fig. 1 at any instant. Thus, the crossing point 1 of the two pointers 15 and 19 corresponds to the point 1 of the main vector triangle of Fig. 1 and the two instruments thus reproduce this main vector triangle, the line between the pivot points 1—2 corresponding to side A, the distance along pointer 15 between pivot point 2 and the crossing point 1 of the two pointers corresponding to side B, the distance along pointer 19 between its pivot point 3 and the crossing point 1 of the two pointers corresponding to side C of the main vector triangle of Fig. 1, and the angles formed at the three corners of the instrument measured triangle being equal to the corresponding angles of the vector triangle of Fig. 1 at any instant.

When the current vectors are being considered the instrument coils will ordinarily be energized through current transformers and, in order to obtain a low value of current at reasonably high voltage suitable for the moving coil systems, I prefer to use a step-up transformer 20 between the current transformer in phase line A and the moving coils of the instruments. For example, normal voltage and current in the circuit supplied by the transformer 20 may then be of the order of 100 volts and 0.1 ampere. This concerns the practical design of the instrument and not its theory of operation.

There are various types of phase-measuring instruments that might be used. In the present case, the instruments are similar. The stationary coil of instrument 10 is energized by a current in phase with the current in line B. The armature consists of the two coils 13 and 14 located on axes ninety degrees displaced from each other. Each of these coils carries current having a definite phase relation with the current in line A. Impedance devices 21 and 22 are connected in series with coils 13 and 14, which impedances are of such character as to cause the currents in these coils to be ninety degrees out of phase with each other and such that coil 14 carries a current substantially in phase with that of line A. The current is led into the moving coils by very flexible spiral conductors and no control springs are used. The corresponding moving coils of the two instruments are connected in series so that the reactance 21 and the resistance 22 serve for both. Such instruments measure phase relationship, and a change in the magnitude of line current as distinguished from a change in phase relation does not affect the deflection so long as it is sufficient to produce the necessary moving torque.

The measuring apparatus described thus produces in effect a sinusoidal vector triangle of the phase currents flowing in the three-phase system ABC and the shape of the triangle varies as the phase relationship of currents varies. The base or side 2—3 of this triangle formed by the line between the pivot points is constant and fixed so that we may then determine the points 4 and 4' of Fig. 1 with respect thereto and derive the relative values and angular relations of the symmetrical direct and reverse phase components for any primary vector triangle produced by the measuring apparatus just as was done in Fig. 1. In fact, we may provide a chart in fixed relation to the measuring apparatus from which the symmetrical component factors may be read off directly for any measured primary vector triangle. Such a chart is shown in Fig. 6 having points 4 and 4' determined as in Fig. 1. Thus point 4' is the crossing point of the pointers 15 and 19 when they form an equilateral triangle with the base 2—3. Point 4 is the apex of an equilateral triangle having the same base 2—3 but constructed below such base line. After the chart has been constructed, the point 4 is no longer used and consequently the lower triangle having point 4 as its apex may be omitted from the finished instrument and the dimensions of the chart confined to that portion which will be used in practice.

The distance of the crossing point 1 of the pointers 15 and 19 from the point 4 is always directly and linearly proportional to the direct symmetrical phase component and the distance from the crossing point of the pointers to point 4' is always directly and linearly proportional to the reverse phase component. When the crossing point coincides with point 4', the direct phase component is one hundred per cent and the reverse phase component is zero per cent, or, in other words, there is no reverse phase component and the direct phase component is equal to the side of the sinusoidal vector equilateral triangle of a balanced system of which one side is represented by the distance 2—3. If I could conceive of a condition where the phase rotation of the primary vector system reverses and is balanced, the crossing point of the pointers would occur at point 4 and the reverse phase component would become one hundred per cent.

I may, therefore, draw on the chart a series of circular phase sequence component percentage lines using points 4 and 4' as centers and the distance 4—4' as one hundred per cent. The crossing point of the pointers, when read with respect to the percentage graduations, lines D, of which point 4 is a center, gives the percentage direct phase component and the crossing point of the pointers with respect to the percentage graduation, lines R, having point 4' as the center gives the percentage reverse phase component. Thus, the measurement represented gives about ninety-seven per cent direct phase component and about seventeen per cent reverse phase component. The exact ampere value of these components may be determined by reading the current in phase A by a meter 23 and multiplying this reading by the percentages indicated on the chart for the symmetrical components in question. For example, if the ammeter 23 shows 700 amperes in phase A, the direct phase component current for the indication given is ninety-seven per cent of 700 or 679 amperes. With the value of current in phase A known, the relative values of current in phases B and C can be estimated at a glance from the relative magnitudes of the sides of the primary triangle formed by the pointers and the base 2—3. In this case, the base represents 700 amperes. If desired, percentage lines for the B and C phase currents may be included on the chart. To prevent confusion, only portions of the phase B and phase C current graduations, indicated by B and C, respectively, have been shown. These graduations are drawn from the pivot points 2 and 3 as centers with the distance 2—4' and 3—4' representing one hundred per cent. The percentage of phase B and phase C currents may then be read off from these graduations at the crossing point of the pointers. The arc at the extremity of the 15 pointer may be graduated to indicate the angle between the phase A and B currents and the arc at the extremity of the pointer 19 may be graduated to indicate the phase angle between the A and C currents. Thus ∟AB is 107 degrees and ∟AC is 134 degrees.

As thus far described, the apparatus will indicate directly the angular relationship and relative percentage magnitude of the primary phase currents of A, B, and C, and the percentage magnitudes of the direct and reverse phase components also expressed in per cent of phase A current, and, with the addition of the ammeter 23, the values of all of these currents are readily determined.

The angular relations between the direct and reverse phase components and the phase A current vector may also be directly indicated by the instrument since the phase A vector is fixed by the line 2—3 and the angular disposition of any direct or reverse phase component with respect thereto can be determined, as illustrated in Fig. 4, by the angle between A and ad and a scale of such angular relations for different crossing points of the instrument pointers marked on the chart. This angle varies as line 1—4, Fig. 1, rotates about point 4 and, for the ad component, is zero when line 1—4 is perpendicular to the base. Such a scale consisting of properly spaced and marked lines 25 radiating from point 4 is provided on the chart and the illustrated measurement indicates that the angle which the symmetrical positive phase component ad makes with the original phase component A is about minus nine degrees. The angles which the corresponding bd and cd components make with the phase A component may, of course, be obtained by adding one hundred and twenty and two hundred and forty degrees, respectively, to the values indicated since the symmetrical component vectors are displaced one hundred and twenty degrees from each other.

Similarly, the angle which any negative phase component bears to the fixed phase A vector varies as the line 1—4', Fig. 1, rotates about point 4', and a scale consisting of lines radiating from point 4' is provided and marked to show the angle between the phase A vector and its corresponding reverse symmetrical component ar. The measurement illustrated shows this angle to be about seventy-five degrees. The measurements of the angles between the symmetrical components and the phase A vector are of interest primarily in connection with analyses of unbalanced conditions. It will be evident that, from the angular measurements directly indicated, the angle between any primary phase vector and any symmetrical component can be readily determined.

In many cases, all of the chart graduations mentioned above will not be required. The graduation of most importance to the operating man will be the indication of negative phase sequence component together with a phase A ammeter which will tell him the permissible safe negative phase sequence current that may be allowed for any given phase A current. Such an equipment is represented in Fig. 7. Magnetic shields not shown will preferably surround the phase-measuring instruments to eliminate the effect of stray fields likely to be encountered when the instrument is installed on a switchboard with other electrical devices. A chart having the per cent of negative phase sequence component is provided and the ammeter in phase A is provided with a scale having two sets of graduations having their zeros at opposite ends of the scale. The upper graduations are in amperes and indicate the value of phase A current. The lower graduations indicate the maximum per cent negative phase sequence current which is safely permissible for the particular installation for which the apparatus is provided. It is evident, that, if the system current is relatively low, a greater degree of unbalance may be tolerated than when the system current is high. Also, that if the system is balanced, a higher current may be carried than when unbalanced. The negative phase sequence is a measure of unbalance. The operator observes that, with a current of 1.7 on the current scale, he may allow not more than about twelve per cent negative phase sequence component. The reading of the phase sequence component from the upper chart tells him that he has reached and slightly exceeded this limit and that immediate steps should be taken to balance the load or reduce it. The shape of the triangle formed by the phase-measuring instruments tells him that phase A is carrying the most current and phase C the least. He, therefore, takes steps to balance the load, for example, by shifting a single-phase feeder circuit supplied by the system which is connected across phases A and B to phases B and C. Let us assume that this change drops the negative phase sequence component to five per cent. The operator may now safely add balanced three-phase load to the system to bring the ammeter reading up to about 3.5. Thus, the phase sequence meter guides the operator in balancing the load and the ammeter guides the operator in maintaining the maximum permissible load whether balanced or unbalanced.

As explained by Lawrence, when a three-phase system has a grounded neutral or its equivalent, the vectors of the currents in the three phases do not necessarily form a closed triangle as there may be a residual current flowing in the neutral which must be accounted for. In such a system then I have in addition to the symmetrical direct and reverse phase components, a third set of symmetrical components called the "uniphase components", the vectors of which must necessarily be combined with the direct and reverse phase components to form the primary vector current diagram of the system. The theory of the symmetrical phase component meter hereinbefore described will then not apply to the grounded neutral system unless the effect of the neutral current, if any, is eliminated. In Fig. 8, I have shown how this may be done so that the same instrument may be used as previously described.

In Fig. 8, 28 may be taken to represent a three-phase generator having a grounded neutral 29 and supplying the system ABC assumed to have various types of loads connected thereto such that there will exist more or less unbalance of the phases and more or less current flowing in the ground between the load and the neutral of the generator. The symmetrical phase component meter employed is the same as previously described and is connected to the system through current transformers as before. However, the line current transformers have, in addition to the secondary windings supplying the symmetrical phase component meter, additional secondary windings 30, both secondary windings of each transformer being wound on the same core.

The extra secondary windings 30 are connected in series in a very low impedance circuit which may, if desired, contain an ammeter 31. Now it will be evident that, if the vectorial sum of the currents in A, B, and C add up to zero, there will be no neutral current and no current will flow in the circuit in which the windings 30 are included. However, if there is a neutral current in the system so that the vectorial sum of the phase currents is other than zero, a current proportional to the residual or neutral current will flow in the circuit of ammeter 31 and may be measured thereby. In other words, the flux components of the current transformers corresponding to the neutral current component in phases A, B, and C, if any, are expended in sending a corresponding current through the low impedance circuit in which ammeter 31 is connected. The effect of such neutral current on the currents transmitted to the symmetrical component meter is, therefore, eliminated and the phase measuring instrument thereof responds to the symmetrical direct and reverse phase component as previously explained.

In some cases, it may be desirable to consider the voltage balance of the three-phase system. The voltage vectors and their symmetrical components may be treated in the same way as for the current vectors and applied to the symmetrical component meter in the same way. The line connections for a symmetrical component voltmeter will, of course, be different than for the ammeter and, in Fig. 9, I have shown the connections for the symmetrical component voltmeter. Where the line voltage is high, potential transformers may be used between the line and instrument connections.

Fig. 10 represents the voltage vector diagram reproduced by the instrument and the voltmeter 32 of Fig. 9 measures the voltage across A and C which is used as the base vector of the meter and corresponds to the distance between the pivots of the two phase-measuring parts thereof.

In accordance with the provisions of the patent statutes, I have described the principle of operation of my invention, together with the apparatus which I now consider to represent the best embodiment thereof; but I desire to have it understood that the apparatus shown and described is only illustrative and that the invention may be carried out by other means.

What I claim as new and desire to secure by Letters Patent of the United States, is:

1. Apparatus for measuring and indicating the three phase sinusoidal vector relations existing in three-phase circuits comprising, a pair of phase-measuring instruments of the type having a stationary member and a movable member including a pointer pivoted on a given axis and arranged to take up a rotary position dependent upon a phase angle measurement between two vectorial quantities, said instruments having their axes of rotation parallel and spaced apart such that the line between their pivot points is representative of one such vector, the pointer of one instrument measuring the angle between said line and a second such vector, and the pointer of the other instrument measuring the angle between said line and the third such vector and crossing the pointer of the first instrument at an angle equal to that between the second and third vectors.

2. Apparatus for producing triangular vector diagrams representative of the three sinusoidal vectors of three-phase circuits comprising, a pair of phase-measuring instruments, one instrument having phase-measuring means including a pivoted pointer for measuring the phase angle between phases 1 and 2, and the other instrument having means including a pivoted pointer for measuring the phase angle between phases 1 and 3, said instruments having their pivot points spaced apart a distance representative of the phase 1 vector, and said pointers crossing each other at a point spaced from the pivot points distances representative of the phase 2 and phase 3 vectors, respectively.

3. Apparatus for reproducing triangular vector diagrams representative of the three sinusoidal vectors of a three-phase alternating current circuit comprising, a pair of phase-measuring instruments each having a stationary part and a pivoted rotating part including a pointer, said instruments having their axes of rotation parallel and spaced apart a distance such that a line between and perpendicular to their axes of rotation represents one of said vectors, and means for energizing said instruments from the different phases of a three-phase source such that their pointers cross each other and form with the line between their axes of rotation the three-phase sinusoidal vector triangle of said circuit.

4. Apparatus for measuring and indicating relative sinusoidal phase vector relations of three-phase circuits comprising, two phase-measuring instruments having stationary and moving coil systems, the moving coil systems having pivot points spaced apart a distance representative of the phase 1 vector, indicating pointers on the moving coil systems of said instruments, means for energizing one of the coil systems of both instruments from a three-phase source with phase 1 energy, means for energizing the other coil system of one instrument from the same source with phase 2 energy such that its pointer makes an angle with a line between the pivot points of the instruments equal to the angle between the phase 1 and phase 2 vectors, and means for energizing the other coil system of the other instrument from the same source with phase 3 energy such that its pointer makes an angle with said line equal to the angle between the phase 1 and phase 3 vectors, said pointers crossing each other at an angle equal to the angle between the phase 2 and phase 3 vectors.

5. Apparatus for measuring and indicating relative sinusoidal phase vector relations of three-phase circuits comprising, two phase-measuring instruments having stationary and moving coil systems, the moving coil systems having pivot points spaced apart a distance representative of the phase 1 vector, indicating pointers on the moving coil systems of said instruments, means for energizing one of the coil systems of both instruments from a three-phase source with phase 1 energy, means for energizing the other coil system of one instrument from the same source with phase 2 energy such that its pointer makes an angle with a line between the pivot points of the instruments equal to the angle between the phase 1 and phase 2 vectors, means for energizing the other coil system of the other instrument from the same source with phase 3 energy such that its pointer makes an angle with said line equal to the angle between the phase 1 and phase 3 vectors, said pointers crossing each other at an angle equal to the angle between the phase 2 and phase 3 vectors, and an electrical measuring instrument for measuring the actual value of one of said phase vector quantities.

6. In combination with a three-phase system, apparatus for measuring and indicating relative sinusoidal phase vector relations of the line currents of such system comprising, a pair of phase-measuring instruments having stationary coils respectively energized in response to the phase 2 and phase 3 currents, and having moving coil systems both energized in response to the phase 1 currents, said instruments having pivot points for their moving coil systems spaced apart such that the line between them is representative of the phase 1 current vector, a pointer on the instrument responsive to phase 1 and phase 2 currents having a phase measuring position representative of the angular position of the phase 2 current vector with respect to said phase 1 current vector line, and a pointer on the other instrument having a phase-measuring position representative of the angular position of the phase 3 current vector with respect to said phase 1 current vector line, said pointers crossing each other and forming with said line the sinusoidal vector triangle of the line currents in said system.

7. In combination with a three-phase system, apparatus for measuring and indicating relative phase vector relations of the line currents of such system comprising, a pair of phase-measuring instruments having stationary coils respectively energized in response to phase 2 and phase 3 currents, and having moving coil systems both energized in response to phase 1 currents, said instruments having pivot points for their moving coil systems spaced apart such that the line between them is representative of the phase 1 current vector, a pointer on the instrument responsive to phase 1 and phase 2 currents having a phase-measuring position representative of the angular position of the phase 2 current vector with respect to said phase 1 current vector line, a pointer on the other instrument having a phase-measuring position representative of the angular position of the phase 3 current vector with respect to said phase 1 current vector line, said pointers crossing each other and forming with said line a vector triangle of the line currents in said system, and means for measuring the actual value of line current in one of said phases.

8. In combination with a three-phase system, apparatus for measuring and indicating the phase voltage vector relationship of said system comprising, a pair of phase-measuring instruments each having stationary and moving coil systems, and each having a pointer on its moving coil system, the pivot points of said pointers being spaced apart such that a line between them is representative of the voltage vector between phases 1 and 3 of said system, means for energizing both instruments in response to the phase 1, 3 voltage, means for energizing one instrument in response to phase 1, 2 voltage such that its pointer represents the 1, 2 phase vector with respect to the line representing the phase 1, 3 vector, and means for energizing the other instrument in response to phase 2, 3 voltage such that its pointer represents the phase 2, 3 vector with respect to the line representing the phase 1, 3 vector, said pointers crossing each other to form with said line the voltage vector triangle of said system.

9. In combination with a three-phase system, apparatus for measuring and indicating the phase voltage vector relationship of said system comprising, a pair of phase-measuring instruments each having stationary and moving coil systems, and each having a pointer on its moving coil system, the pivot points of said pointers being spaced apart such that a line between them is representative of the voltage vector between phases 1 and 3 of said system, means for energizing both instruments in response to the phase 1—3 voltage, means for energizing one instrument in response to phase 1—2 voltage such that its pointer represents the 1—2 phase vector with respect to the line representing the phase 1—3 vector, means for energizing the other instrument in response to phase 2—3 voltage such that its pointer represents the phase 2—3 vector with respect to the line representing the phase 1—3 vector, said pointers crossing each other to form with said line the sinusoidal voltage vector triangle of said system, and means for measuring the actual value of one of said phase voltages.

10. In combination with a three-phase system having a grounded neutral or its equivalent, apparatus for measuring and indicating relations between the sinusoidal phase currents of three-phase systems including phase-measuring instruments, current transformers energized in response to the currents in the line conductors of said system, secondary windings on said transformers connected to energize said phase-measuring instruments, and means for eliminating the effect of any neutral current flowing in said line conductors on the secondary currents supplied to said phase-measuring instruments comprising additional secondary windings on said transformer and a low impedance circuit connecting said additional secondary windings in a closed series circuit.

11. In combination with a three-phase alternating current system having a grounded neutral or the equivalent, measuring means for said system, current transformers in each line of said system for supplying said measuring means, means for eliminating the effect of any neutral current flowing in said lines on said measuring means comprising secondary windings on each transformer connected in series relation in a low impedance circuit, and an ammeter in said circuit for measuring the neutral current.

12. In combination with a three-phase circuit, phase sequence current component measuring apparatus therefor comprising a pair of phase-measuring instruments having pivoted pointers, their pivot points being spaced apart such that the line between them is representative of one side of the sinusoidal three-phase current vector triangle of said circuit, means for supplying one of said instruments by currents from two phases of said circuit such that the pointer thereof defines with said line a second side of such triangle, means for supplying the other instrument with currents from another two phases of said circuit such that the pointer thereof crosses the other pointer and completes said triangle, a phase sequence scale for said apparatus from which the per cent of negative phase sequence current of said circuit may be read with respect to the crossing point of said pointers, and an ammeter for measuring the current in one phase of said circuit, said ammeter having in addition to its usual current value graduations, reversely arranged graduations in per cent of allowable negative phase sequence current for the different values of current as measured by said ammeter.

13. A phase sequence meter for three-phase circuits comprising a pair of phase-measuring instruments having pivoted pointers, the pivot points of said pointers being spaced apart such that the line between them represents one side of the sinusoidal three-phase vector triangle of such a circuit, means for energizing one of said instruments from two phases of such a circuit so that its pointer defines with said line another side of such vector triangle, means for energizing the other of said instruments from another two phases of such circuit so that its pointer crosses the other pointer and completes such vector triangle, and a phase sequence scale graduated in per cent with respect to the crossing point of said pointers.

14. A negative phase sequence meter for three-phase circuits comprising a pair of phase-measuring instruments having pivoted pointers, the pivot points of said pointers being spaced apart such that the line between them represents one side of a sinusoidal three-phase vector triangle of such a circuit, means for energizing one of said instruments from two phases of such a circuit so that its pointer defines with said line another side of said triangle, means for energizing the other instrument so that its pointer crosses the other pointer and completes said triangle, and a negative phase sequence scale graduated in per cent with respect to the crossing point of said pointers.

15. A positive phase sequence meter for three-phase circuits comprising a pair of phase-measuring instruments each having pivoted pointers, the pivot points of said pointers being spaced apart such that a line between them represents one side of a sinusoidal vector triangle of such a circuit, means for energizing one of said instruments from such a circuit such that its pointer defines with said line another side of such triangle, means for energizing the other instrument from another two phases of such a circuit such that its pointer crosses the pointer of the other instrument and completes such triangle, and a positive phase sequence scale graduated in per cent with respect to the crossing point of said pointers.

16. Apparatus for producing sinusoidal vector triangles of three-phase circuits comprising a pair of phase-measuring instruments each having pivoted pointers, the pivot points of said pointers being spaced apart such that the line between them represents one side of such a triangle, means for energizing one of said instruments from two phases of such a circuit such that its pointer defines with said line another side of such triangle, means for energizing the other instrument from another two phases of such circuit so that its pointer crosses the other pointer and completes such triangle, and graduations at the extremities of said pointers indicating the angles which said pointers make with said line.

17. Apparatus for producing sinusoidal vector triangles of three-phase circuits comprising a pair of phase-measuring instruments, said instruments having pointers which are pivoted at points spaced apart such that the line between said points represents one side of the three-phase vector triangle of such a circuit, means for energizing one of said instruments such that its pointer defines with said line another side of such triangle, means for energizing the other instrument such that its pointer crosses the pointer of the other instrument and completes such triangle, and a chart having graduations indicative of the relative lengths of the sides of said triangles defined by said pointers, said graduations being read with reference to the crossing point of said pointers.

18. Phase sequence angle measuring apparatus comprising a pair of phase-measuring instruments having pivoted pointers, the pivot points of such pointers being spaced apart such that the line between them represents one side of a three-phase sinusoidal vector triangle of such a circuit, means for energizing one of said instruments from two phases of such a circuit such that its pointer defines with said line another side of such triangle, means for energizing the other instrument such that its pointer crosses the pointer of the other instrument and completes such triangle, and a scale graduated in angles which the positive phase sequence vector of such circuit makes with the phase vector which is represented by said line, said scale being read with reference to the crossing point of said pointers.

19. Phase sequence angle measuring apparatus comprising a pair of phase-measuring instruments having pivoted pointers, the pivot points of said pointers being spaced apart so that the line between them represents one side of the three-phase sinusoidal vector diagram of such a circuit, means for energizing one of said instruments from two phases of such a circuit so that its pointer defines with said line another side of such triangle, means for energizing the other instrument from another two phases of such a circuit so that its pointer crosses the pointer of the other instrument and completes such triangle, and a scale graduated in angles which the negative phase sequence vector of such circuit makes with the vector represented by said line, said scale being read with reference to the crossing point of said pointers.

THEODORE A. RICH.